W. C. DAVIS,

Assignor to W. C. DAVIS & Co.

Oven and Oven-Door.

No. 9,243. Reissued June 8, 1880.

Attest

Edgar J. Gross

John E. Jones

Inventor

Wm C. Davis

By Hosea T. Ellsworth

His Attys

N. PETERS, PHOTO-LITHOGRAPHER, WASHINGTON, D. C.

UNITED STATES PATENT OFFICE.

WILLIAM C. DAVIS, OF CINCINNATI, OHIO, ASSIGNOR TO W. C. DAVIS & CO., OF SAME PLACE.

OVEN AND OVEN-DOOR.

SPECIFICATION forming part of Reissued Letters Patent No. 9,243, dated June 8, 1880.

Original No. 191,119, dated May 22, 1877. Application for reissue filed November 18, 1878.

*To all whom it may concern:*

Be it known that I, WILLIAM C. DAVIS, of Cincinnati, in the county of Hamilton and State of Ohio, have invented a new and useful Improvement in Ovens and Oven-Doors; and I do hereby declare the following to be a full, clear, and exact description thereof, reference being had to the accompanying drawings, forming part of this specification, in which—

Figure 1:
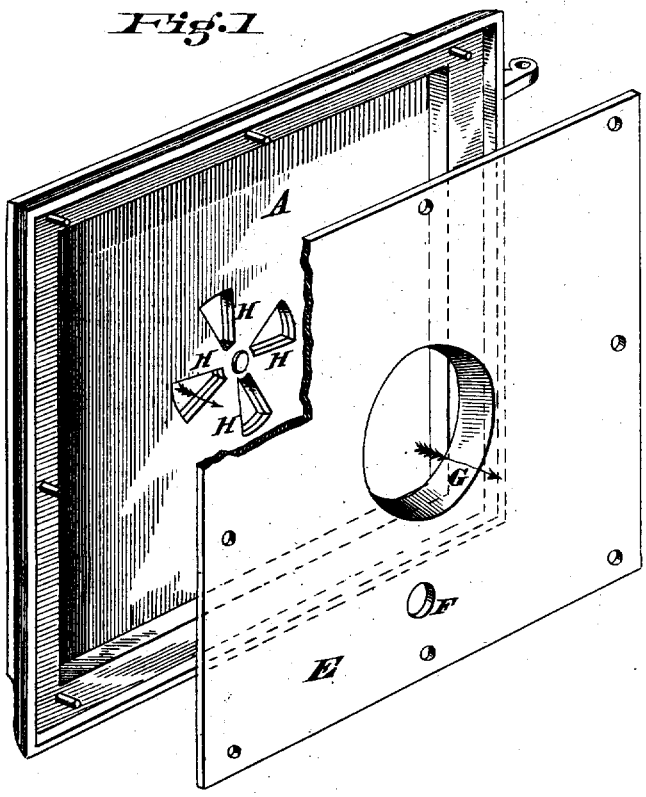
Figure 2:
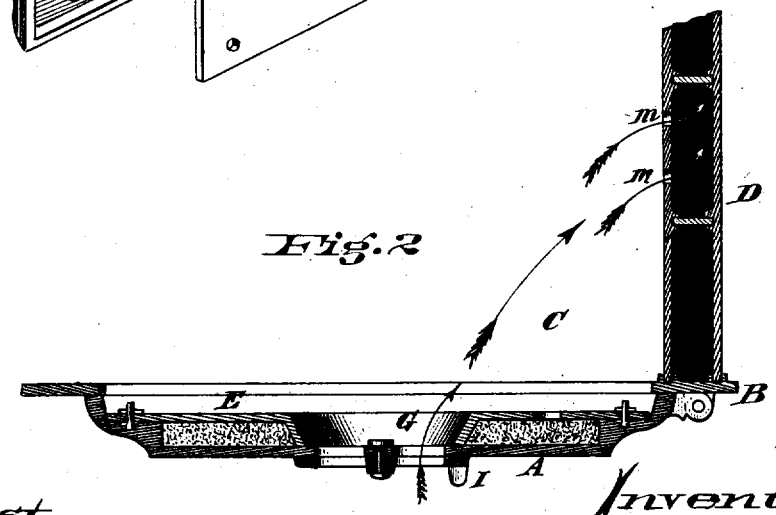

Figure 1 is a perspective view of an oven-door, showing one mode of carrying out my invention; and Fig. 2 is a horizontal section of the same, together with parts of the side plates and rear flue-plates.

Similar letters of reference denote the same parts in the several figures of the drawings.

In the construction of cooking stoves and ranges a large amount of heat from the oven is lost by radiation from the oven-doors, thereby necessitating the consumption of a larger quantity of fuel than is actually necessary for cooking purposes, besides causing an unequal distribution of heat within the oven.

The ovens are usually surrounded upon four sides—to wit, the top, bottom, and front and rear sides—with heating-surfaces, while the doors, instead of throwing heat into the oven, radiate it therefrom, and for this reason should be so constructed or protected as to resist the passage of heat and retain it in the oven as fully as possible.

My invention has for its object to accomplish this result; and to that end it consists in lining the inner surface wholly or partly with a material or materials which are non-conductors of heat, or in such a construction of the doors as shall materially retard the escape of heat from the oven. This being the principle of my invention, I will now proceed to describe, in detail, one mode in which I have contemplated applying it.

In the accompanying drawings, A represents the oven-door, of any preferred pattern or design, hinged to the side plate, B, of the stove. C is the oven-space, and D the back flues of the stove behind the oven.

The inner face of the door is lined with plaster-of-paris or other non-conductor of heat, which is kept in place or prevented from falling out by suitable fastenings. In this example of my invention a plate, E, is employed for the purpose, screwed or otherwise secured to the door at or near the edges.

If the non-conducting material is of such a character that it can be formed upon the inner face of the door, this may be done through an opening, F, in the plate after the latter has been applied to the door.

By the employment of the non-conducting material the heat is confined within the oven, which is therefore rapidly brought to the requisite temperature without unnecessary waste of fuel and maintained equably throughout the time the oven is required for use.

The door may be provided with register-openings for the admission of cold air to the oven when it is found desirable to cool the upper portions thereof, and for this purpose the plate E may be formed with a neck or collar, G, which passes through the non-conducting material, to surround a series of openings, H, in the door, as shown in Fig. 2.

A register, I, on the outside of the door serves to regulate the admission of the air.

The plate which forms the rear wall of the oven is formed with one or more openings, *m*, into the back flue, and should the oven become overheated the temperature can be reduced by opening the register in the door to the requisite extent, in order that the cool air from without may pass into and through the oven to the exits *m*, and thence into the rear flue. This will also equalize the temperature in the oven, as well as prevent it from becoming too hot.

Having thus described my invention, what I claim is—

1. The oven-door provided with a filling which is a non-conductor of heat, and with a registered opening through the non-conducting material, substantially as described, for the purpose specified.

2. The oven-door A, provided with the non-conducting filling, as described, and with the plate E, for holding the filling in place, substantially as described, for the purpose specified.

3. The combination of the collar or neck on the fastening-plate E with the non-conducting material and registered opening in the oven-door, substantially as described, for the purpose specified.

4. The combination of the register-opening in an oven-door having a filling of non-conducting material with the exit-openings *m*, communicating with the back flue of the stove behind the oven, substantially as described, for the purpose specified.

WILLIAM C. DAVIS.

Witnesses:
L. M. HOSEA,
E. A. ELLSWORTH.